Aug. 4, 1970    R. R. METRULIS    3,522,657
COMBINATION LEVEL, RULE AND PROTRACTOR DEVICE
Filed Feb. 19, 1969    2 Sheets-Sheet 1
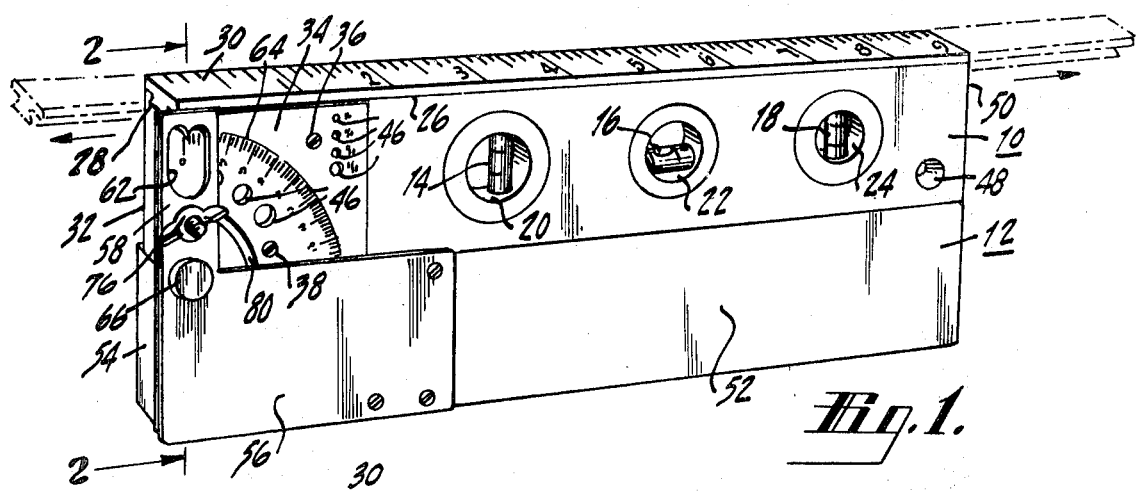
Fig. 1.
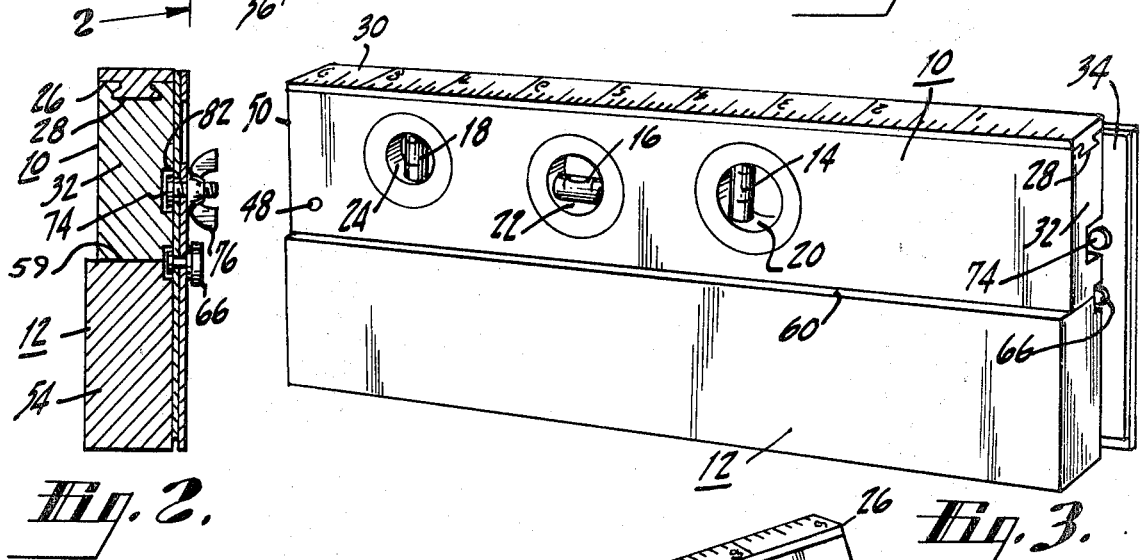
Fig. 2.    Fig. 3.
Fig. 4.
INVENTOR
RAYMOND R. METRULIS
BY Leonard W. Suroff
ATTORNEY Aug. 4, 1970   R. R. METRULIS   3,522,657
COMBINATION LEVEL, RULE AND PROTRACTOR DEVICE
Filed Feb. 19, 1969   2 Sheets-Sheet 2
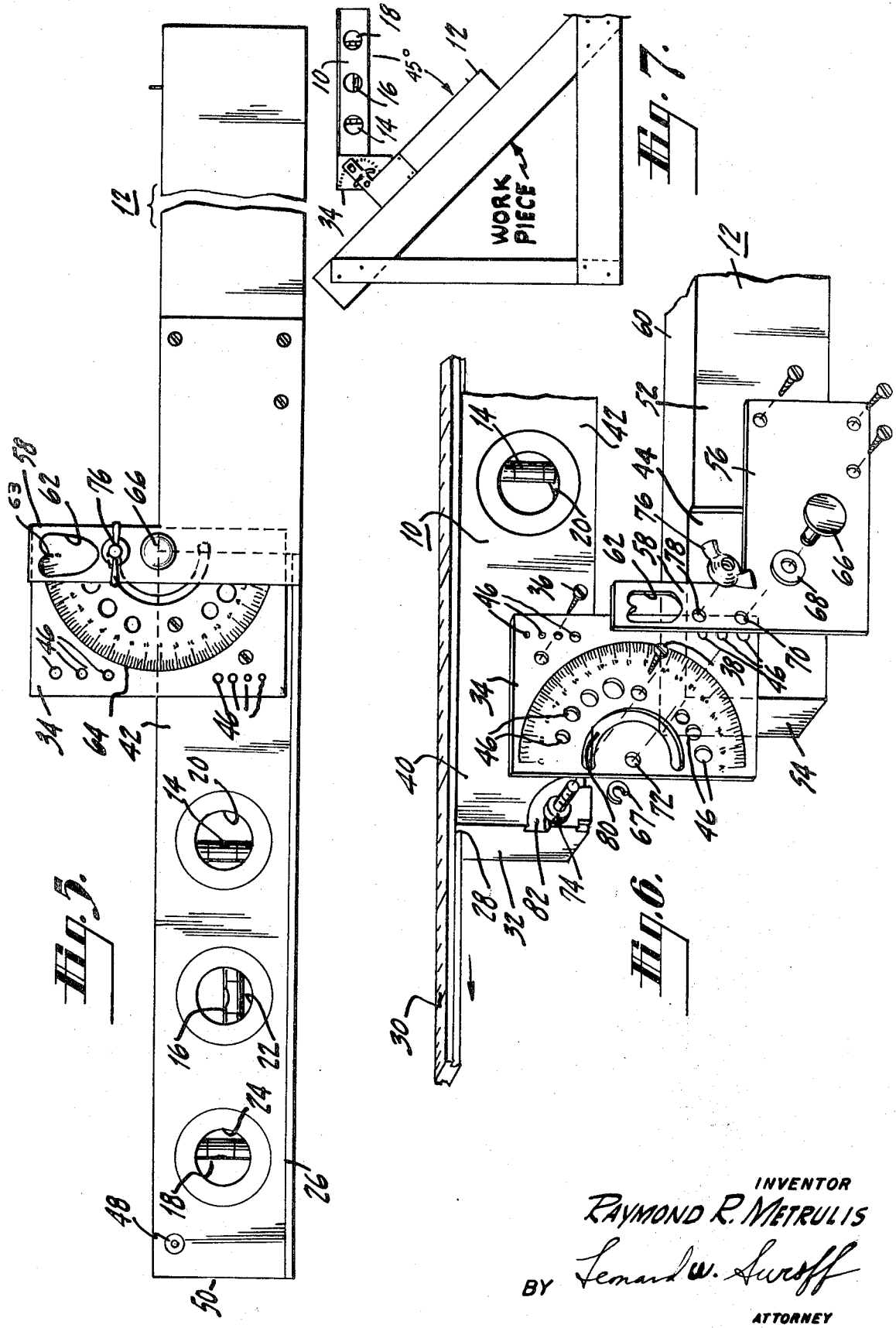
INVENTOR
RAYMOND R. METRULIS
BY Leonard W. Auroff
ATTORNEY

3,522,657
COMBINATION LEVEL, RULE AND PROTRACTOR DEVICE
Raymond R. Metrulis, 5 Franklin Place,
Massapequa, N.Y. 11758
Filed Feb. 19, 1969, Ser. No. 800,507
Int. Cl. G01c 9/00
U.S. Cl. 33—88                               3 Claims

ABSTRACT OF THE DISCLOSURE

A compact device is provided which includes within two longitudinally extending arm members a level, rule, protractor and drill bit size gauge.

BACKGROUND OF THE INVENTION

This invention relates to measuring and leveling devices, and more particularly to an improved combination level, rule and protractor device of the type shown and described in my U.S. Pat. No. 2,878,569, for Combination Level, Rule and Protractor Device, issued Mar. 24, 1959.

Briefly described, the device of the invention includes two longitudinally extending arm members joined together by a single fastening means for relative pivotal movement about said means. Coupled to the arm members and forming a part thereof are a rule, liquid level, drill bit size gauge and protractor.

OBJECTIVES OF THE INVENTION

It is an object of the present invention to provide an improved combination level, rule and protractor device that may be easily adjusted to a variety of positions during usage thereof.

Another object of the present invention is to provide a device that easily permits the reading of the angular position of the arm members during adjustment thereof.

Another object of the present invention is to provide a device that has a ruler associated therewith that is extendable in two directions with respect to one of the arms thereof.

Another object of the present invention is to provide a device which is also adapted to measure diameters of drill bits, screws or other items having a circular configuration.

Other objects of the present invention will be obvious as the description proceeds.

DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, in which:

FIG. 1 is a front perspective view of a combined level, rule and protractor device constructed in accordance with the present invention;

FIG. 2 is a sectional view taken on line 2—2 of FIG. 1;

FIG. 3 is a rear perspective view of the device;

FIG. 4 is a front perspective view similar to FIG. 1, but showing the arms of the device slightly separated to form an acute angle;

FIG. 5 is a front perspective view showing the arms of the device in longitudinal alignment;

FIG. 6 is an exploded view showing the assembly of the two arm members of the device; and FIG. 7 is a front view of the device showing its operation as a protractor and inclinometer.

DETAILED DESCRIPTION OF THE INVENTION

Referring now to the drawings, the improved combination level, rule and protractor device of the present invention includes a pair of longitudinally extending arm members 10 and 12 of substantially rectangular cross section, and which may be made of wood, plastic, metal or other rigid or semirigid material. The arm members 10 and 12 are substantially equal in length and height dimensions, with the upper arm member 10, as viewed in FIGS. 1-4, being slightly narrower in the width dimension than the lower member 12. A plurality of spaced liquid levels 14, 16, and 18 are mounted on the upper arm 10 and recessed in openings 20, 22 and 24 which extend through the arm 10. Levels 14 and 18 are vertical levels and level 16 is a horizontal level. The top edge wall 26 of the upper arm member 10 is provided with a dovetail groove 28 in which a rule 30 is slidably mounted. The rule 30 may be calibrated in inches or other markings and in operation may be slidably extended outwardly from either end of the upper arm member 10. Also mounted on the upper arm member 10 and slightly overhanging an end 32 thereof, is a protractor plate 34, the protractor plate being secured as by screws 36 and 38 to a recessed portion 40 provided in the front side 42 of the upper arm member 10. The lower arm member 12 is also provided with a recess 44 for slidably receiving the lower portion of the protractor plate 34 during operation of the device. Included in the protractor plate member 34 are a plurality of circular apertures 46, each having a different fixed diameter, with the respective diameter marking of each aperture being inscribed on the protractor plate adjacent the respective apertures. The apertures 46 thus provide a reference or gauge for determining the diameter or size of a drill bit. A marking opening 48 is provided in the upper arm member 10 adjacent the other end 50 so that the point of a marking device such as a pencil or scribe may be extended therethrough.

To maintain the arm members 10 and 12 in alignment with each other when closed as shown in FIG. 1, retaining means is provided in the form of a vertically extending pin 47 seen in FIG. 4, extending from arm member 12 into a recess (not shown) in arm member 10. In this way undue stress is not applied against the associated locking means.

Mounted on and fixed to a portion of the front side 52 of the lower arm member 12 and extending slightly beyond an end wall 54 thereof is a front cover plate 56. The cover plate 56 has an arm portion 58 which extends beyond the upper or top edge wall 60 of the lower arm member 12 so as to be at substantially right angles to the portion of the cover plate 56 overlying the front side 52 of the lower arm member 12 and extending slightly beyond an end 54 thereof. The cover plate arm portion 58 has a protractor reading opening in the form of an enlarged heart shaped aperture 62 disposed in alignment with the peripheral edge portion of a semicircular marking or angular indicating scale 64 inscribed on the protractor plate 34.

Referring now particularly to FIG. 6, the assembly of the two arm members 10 and 12 is illustrated. As can be seen in the figure, the arm members 10 and 12 are pivotally connected together by a single fastening means such as a rivet 66 extending through spring means in the form of a spring washer 68, apertures 70 and 72 in the cover and protractor plates 56 and 34 respectively and a key washer 67. In addition to serving as a fastening means, the rivet 66 acts as a pivot center for relative movement of the two arm members about the rivet 66. For example, the arm members 10 and 12 may be moved into longitudinal alignment end to end as shown in FIG. 5, or into a superposed position with the bottom side wall 59 of the upper arm member 10 seating on the top side wall 60 of the lower arm member 12, as shown in FIGS. 1, 2 and 3 or any position therebetween as for example, the acute angle position shown in FIG. 4.

To lock the arm members 10 and 12 into any of the aforementioned positions during operation of the device, locking means in the form of a screw 74 and wingnut 76 assembly is provided. As seen in FIG. 2, the fastening means as formed by the rivet 66 and the locking means in the form of a screw 74 and wingnut 76 are in vertically spaced apart position from each other to provide a degree of leverage in the holding power of the locking means when the wingnut 76 is tightened. This is important in that the positioning of the arms 10 and 12 is often done by the user when he is simultaneously holding other implements or the actual members he is trying to align in place, as is often the case in construction or alteration jobs. It is important that a quick positioning of the respective arms in place is accomplished and by positioning the locking means in spaced relation to the fastening means this is facilitated. Since less tightening force is required thereby diminishing the possibility of slippage between the two arms 10 and 12 prior to their being held in fixed position to each other.

Referring again to the exploded assembly view of FIG. 6, an aperture 78 is provided in the cover plate arm portion 58 beneath the reading aperture 62 to permit the user to gradually adjust the respective arm members 10 and 12 into a fixed position, indicating means is provided with the aperture 62 in the form of a pointer 63. Since the pointer is formed by a gradual taper the user can view the exact position such that a fine adjustment is possible. The pointer 63 permits the indicating scale 64 to be viewed on both sides thereof such that irrespective of which way the adjustment of the arms is being made the viewer can see the position on the scale 64. In addition the indicating means and the locking means are in substantial vertical alignment with each other such that the user as soon as the right angular position has been reached can tighten the wingnut 76 immediately without first having to seek out the wingnut. An arcuately shaped opening 80 radially spaced from and corresponding in curvature to the semi-circular indicating scale 64 is provided in the protractor plate 34. An arcuate channel 82 is provided in the front surface 42 of the upper arm member 10 and beneath the protractor plate 34 in alignment with the arcuate opening 80. The screw 74 seats in the channel 82 extending through the arcuate opening 80 and aperture 78 and is capped by the wingnut 76. Thus, during pivotal movement of the arm members 10 and 12, the screw 74 rides in the channel 82 and arcaute opening 80 in the protractor plate and by tightening the wingnut 76 on the screw 74, the arm members can be securely locked into any selected position.

The device of the invention may be used in a variety of ways, as for example, as a rule, level, or as a protractor any inclinometer as operatively illustrated in association with a workpiece in FIG. 7.

Many other changes could be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

I claim:

1. A combined level, rule and protractor device, comprising:
    (A) a pair of longitudinally extending arm members of generally rectangular cross section, each arm member having two end walls, front and back side walls, and top and bottom side walls, the top wall of one of said arm members having a groove extending along the length thereof, the front wall portion of said other arm member being slightly recessed in the area adjacent an end wall thereof;
    (B) a plurality of spaced liquid levels mounted within the body of said one arm member and exposed for viewing from the front and back side walls thereof;
    (C) a rule received in said groove for sliding movement along the length of said one arm member so as to extend outwardly from one end wall thereof when moved in the direction of said one end wall, and to extend outwardly from the other end wall thereof when moved in the direction of other end wall;
    (D) a protractor plate having a semi-circular protractor marking scale inscribed thereon, said plate being mounted on said one arm member so that portion thereof covers a portion of the front side wall of said one arm member and a portion of said protractor plate depends beyond the bottom wall of said one arm member, said plate including an arcuately shaped opening radially spaced from and corresponding in curvature to said protractor marking scale, and a plurality of circular apertures of various diameters for indicating the size of a received drill bit, said one arm member front side wall having an arcuately shaped channel in alignment with said protractor plate arcuate opening;
    (E) a cover plate mounted on said other arm member so as to cover a portion of the front side wall thereof and overlie the recessed area therein, said cover plate having an arm portion adjacent an end wall and extending beyond said front side wall of said other arm member and at substantially right angles to the top side wall of said other arm member;
    (F) means secured to said cover and protractor plates and connecting said pair of arm members together for relative pivotal movement between a longitudinally aligned position end to end, and a superposed position with the bottom side wall of said one arm member resting on the top side wall of said other arm member wherein the depending portion of said protarctor plate is received in the recess in the front wall of said other arm member and beneath said cover plate;
    (G) said cover plate arm portion having a locking screw opening and a reading opening disposed therein, said reading opening and a reading opening disposed therein, said reading opening being in alignment with the marking scale on said protractor plate, and said locking screw opening overlying the arcuate opening in said protractor plate; and
        (a) said reading opening including indicating means having a pointer overlying the scale on said protractor plate to arcuately position said arm members with respect to each other,
        (b) said indicating means in said reading opening being tapered into said pointer so as to permit the viewing of the scale on said protractor plate on both sides of said pointer,
    (H) locking means comprising a screw and wingnut assembly, the head portion of said screw being seated in the channel in said one arm member with the screw threaded portion extending through the arcuate opening in said protractor plate and the locking screw opening in said cover plate and being threadably received in said wingnut for locking said arm members into a selected pivotal position;
        (a) said locking means being in spaced relation to the means securing said pair of arms together so as to provide a leverage force in retaining the arms in fixed position with respect to each other,
        (b) said indicating means and said locking means being in substantially vertical alignment with each other to permit the user to engage the locking means when the indicating means is in proper position, and (J) retaining means associated with said arm members to retain them in fixed relative position when said arm members are in overlapping closed relationship to each other, said retaining means including a pin extending from one of said arm members and adapted to extend within a recess of said other arm member.

2. The device as defined in claim 1, wherein said circular apertures on said protractor plate are of incrementally increasing diameters to permit proper selection of the diameter opening required.

3. The device as defined in claim 2, wherein one of said members includes a marking opening extending therethrough to receive a marking device.

References Cited

UNITED STATES PATENTS

| | | | |
|---|---|---|---|
| 409,414 | 8/1889 | Meck | 33—178 |
| 447,475 | 3/1891 | Pomeroy | 33—178 |
| 981,598 | 1/1911 | Sandelin | 33—118 |
| 1,166,512 | 1/1916 | Dannenfelser | 33—158 |
| 1,979,567 | 11/1934 | Nicholson | 33—105 |
| 2,878,569 | 3/1959 | Metrulis | 33—88 |
| 2,972,191 | 2/1961 | Kichta | 33—100 |
| 3,374,545 | 3/1968 | Monroe | 33—161 |

HARRY N. HAROIAN, Primary Examiner

U.S. Cl. X.R.

33—75, 118